United States Patent [19]

Kelly

[11] Patent Number: 4,591,329
[45] Date of Patent: May 27, 1986

[54] CONCENTRIC LOADING VULCANIZER AND METHOD OF VULCANIZING

[76] Inventor: Thomas L. Kelly, Kelly Energy Systems, Inc., P.O. Box 2583, Waterbury, Conn. 06723

[21] Appl. No.: 632,017

[22] Filed: Jul. 18, 1984

[51] Int. Cl.⁴ .............................................. B29H 5/01
[52] U.S. Cl. .................... 425/340; 425/446; 425/500; 425/34 A
[58] Field of Search .............. 425/28 B, 34 A, 40, 425/50, 500, 501, 506, 518, 335, 339, 340, 342.1, 383, 384, 445, 446, 363, 43

[56] References Cited

U.S. PATENT DOCUMENTS

| | | | |
|---|---|---|---|
| 1,551,025 | 8/1925 | Gray | 425/445 X |
| 1,665,311 | 4/1928 | Laursen | 425/446 X |
| 2,483,709 | 10/1949 | Paulsen | 425/445 |
| 2,550,183 | 4/1951 | Bourne | 425/43 X |
| 2,698,968 | 1/1955 | Callahan et al. | 425/446 X |
| 2,837,769 | 6/1958 | Wagner | 425/446 X |
| 2,997,739 | 8/1961 | Smith et al. | 425/446 X |
| 3,162,895 | 12/1964 | Pusch | 425/446 X |
| 3,199,195 | 8/1965 | De Boer | 425/340 X |
| 3,867,087 | 2/1975 | Bulson | 425/445 X |
| 3,884,739 | 5/1975 | Hindin et al. | 425/34 A X |
| 4,199,542 | 4/1980 | Taylor | 425/363 X |

*Primary Examiner*—J. Howard Flint, Jr.
*Attorney, Agent, or Firm*—Hayes & Reinsmith

[57] ABSTRACT

A vulcanizer and method for vulcanizing sheets of unvulcanized elastomeric material is presented in which the sheets are formed from generally rectangular small sections of unvulcanized material where the edges of the sections are tapered and mated together along their maximum dimension to form longitudinally extending seams within large sheets. The sheets are wrapped onto a series of concentrically assembled mandrels having different diameters, which serve as individual supports for the multiple wraps of sheet material. Each mandrel is received within the mandrel of the next larger diameter and is supported within the vulcanizing chamber by self-supporting mounting devices or carriage.

11 Claims, 8 Drawing Figures

CONCENTRIC LOADING VULCANIZER AND METHOD OF VULCANIZING

BACKGROUND OF THE INVENTION

This invention generally relates to vulcanizing flexible elastomeric materials or compositions and the like and concerns an apparatus for vulcanizing flexible roofing materials such as a rubber membrane or sheet.

It is to be understood that the expression "vulcanizing" means subjecting an unvulcanized product to elevated temperatures and elevated pressures for a period of time sufficient as to cause development of a cross-linked integral molecular structure.

Various forms of vulcanizing apparatus and methods of vulcanizing have been developed for use in the manufacture of a wide variety of products. Illustrative of these vulcanizing units are U.S. Pat. No. 4,199,542 issued in the name of Challer E. Taylor describing a method and apparatus for continuously vulcanizing hose product, U.S. Pat. No. 2,550,183 issued in the name of H. A. Bourne setting forth an apparatus for molding V-belts and U.S. Pat. No. 1,368,679 issued in the name of A. Adamson which discloses a conventional vulcanizing unit.

An established procedure for vulcanizing sheet products such, for example, as a flexible rubber roofing membrane, has been to calendar sheet material in 4 feet by 20 feet sections to form large sheets, e.g., 48 feet by 20 feet (utilizing 13 sections) or 100 feet by 20 feet (using 25 sections). The 4 feet by 20 feet sections are adhered along their length with corresponding edges being lapped or abutted. The resultant large sheet is then wrapped about a mandrel with talc dusted between sheet layers to prevent the vulcanized sheet from adhering together. A series of such identically formed sheets are wrapped about identical individual mandrels which are fitted into a vulcanizing chamber for treatment. The mandrels are placed side by side within the vulcanizing chamber on a series of vertically spaced horizontal supports. However, the resulting arrangement does not efficiently use the available space within the vulcanizing chamber, and as a result, a greater amount of energy is expanded than necessary to cure the sheet material with concomitant increased labor and handling.

The above described conventional practice is unnecessarily expensive in view of the labor and manufacturing costs and inefficiencies, particularly with regard to seaming the smaller sections into large sheets and to the loading of the large sheets onto the mandrels. Moreover, a high percentage of sheets contain deformations, bumps, rips or noticeable seams when manufactured in accordance with conventional techniques.

As a result, it is desirable to develop a process which not only reduces manufacturing costs and labor, but is more efficient and eliminates deformations to produce a high quality uniform sheet. Additionally, conventional vulcanizing methods do not provide means for removing talc from between wrapped layers of the sheets. The talc residue must be removed before use or installation so that adhesive gum tapes and other materials will adhere to the surface of the sheet. Currently, talc is removed by washing sheets with solvents and other laborious methods of cleaning after removing the sheets from the vulcanizing chamber.

SUMMARY OF THE INVENTION

The invention comprises an apparatus wherein a series of concentric mandrels are arranged in radially spaced relationship to one another so that they will individually accept convolutions of unvulcaned sheets whereby the capacity of a vulcanizing chamber is significantly increased. The mandrels are arranged as to allow spacing between adjacent individual mandrels such that convolutions of unvulcanized sheets can be wrapped without contacting the inside surface of the next larger diameter mandrel while yet ensuring desired heat transfer throughout the vulcanizing chamber.

The invention also involves an apparatus for vulcanizing long lengths of elastomeric sheets utilizing a method comprising the formation of large sheets of flexible roofing material by tapering and then mating tapered edges of elongated sheet sections along their longitudinally extending edges to form a limited number of longitudinal seams in a large sheet. Utilizing such tapered edges, the seams between the small sheets are less noticeable, provide seams of relatively increased strength to the large sheets and reduce the cutting and splicing normally required in conventional sheet forming procedures. The sheets so formed are then wrapped about a series of mandrels of progressively reduced diameter concentrically arranged inside the largest diameter mandrel within the vulcanizing chamber. Such an arrangement of the mandrels not only increases the capacity of a vulcanizing unit but reduces the total energy necessary for vulcanizing the large sheets. The method of using the apparatus of this invention also provides a step for removing talc from between wraps of the sheet by a sudden release of the internal pressure to force or effectively blow the talc from between wraps.

OBJECT OF THE INVENTION

A principle object of the invention is to provide a new and improved apparatus for vulcanizing long lengths of flexible membranes or sheets and having a construction wherein in which the capacity of the apparatus is significantly increased and the energy necessary for vulcanizing is decreased because of the use of a concentric mandrel arrangement.

Another object of the invention is to provide a simple and economical vulcanizing apparatus to achieve the production of flexible sheets of uniform high quality.

A further object of this invention is to provide a new and improved apparatus to be used in a manufacturing process for vulcanizing flexible sheets and the like which obviates conventional manufacturing inefficiencies, steps and costs associated with established manufacturing procedures for such products while providing increased production rates in an economical method of manufacture.

A still further object of this invention to provide an apparatus for vulcanizing flexible sheets of the type described which automatically provides for removing talc from between wraps of the sheet material.

Yet another object of this invention to provide an apparatus for use in a method for forming sheet material which mates elongated tapered edges of smaller sheets to form longitudinally extending seams in a stronger and more uniform larger sheet.

Other objects will be in part obvious and in part pointed out in more detail hereinafter.

DETAILED DESCRIPTION OF THE INVENTION

Figure 1:
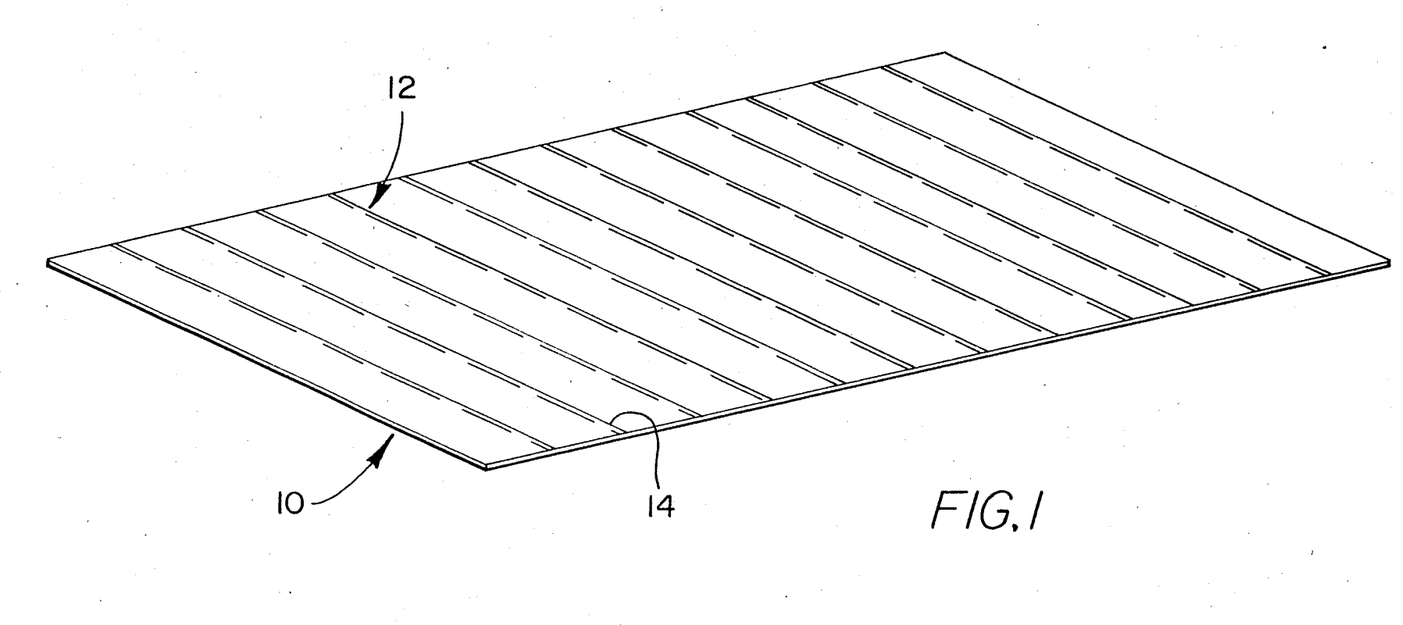
FIG. 1 is a plan view showing a conventional arrangement of a series of small flexible membrane sections which collectively form a large sheet for a vulcanizing process.

Referring to the drawings, and more specifically to FIG. 1, there is illustrated a conventional series of unvulcanized sections 12 of flexible membrane material forming an unvulcanized large sheet 10. Sections 12 are typically 4 feet by 20 feet and are joined along seams 14 to form large sheet 10. Large sheet 10 is typically 20 feet by 100 feet but may vary in size. Large sheet 10 is formed by lapping or abutting adjoining edges of sections. When lapping is employed, a portion of one edge of one section overlies a portion of an adjoining edge of an adjacent section creating a seam 14. A solvent is placed between edges of sections 12 providing a tacky seam before vulcanization. Once formed, each large sheet 10 is wrapped around pipes or mandrels (not shown) in preparation for a vulcanizing process. Powder substances, such as talc, mica dust or the like are placed between wraps of each large sheet 10 to prevent then from sticking.

Figure 2:
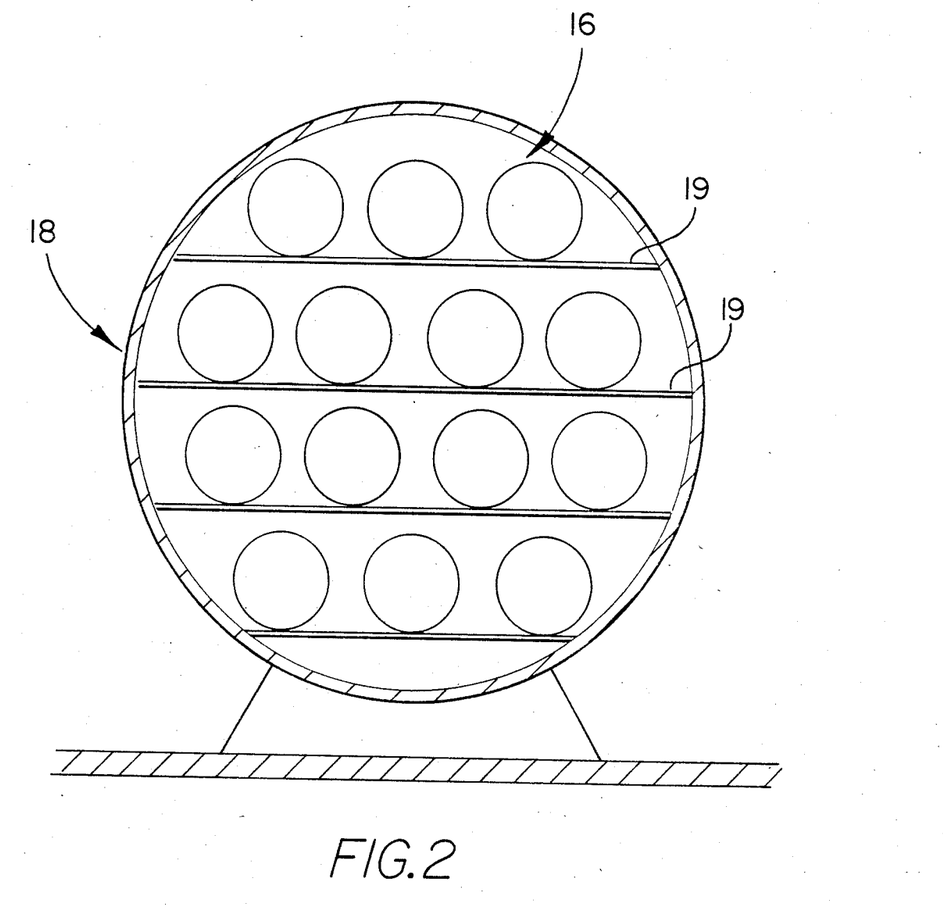
FIG. 2 is a end view of an arrangement of mandrels used in a conventional vulcanizing process.

FIG. 2 illustrates a conventional arrangement of mandrels 16 loaded within a vulcanizing chamber 18. Mandrels 16 are stacked side-by-side on vertically spaced horizontal supports 19 within vulcanizing chamber 18.

Figure 3:
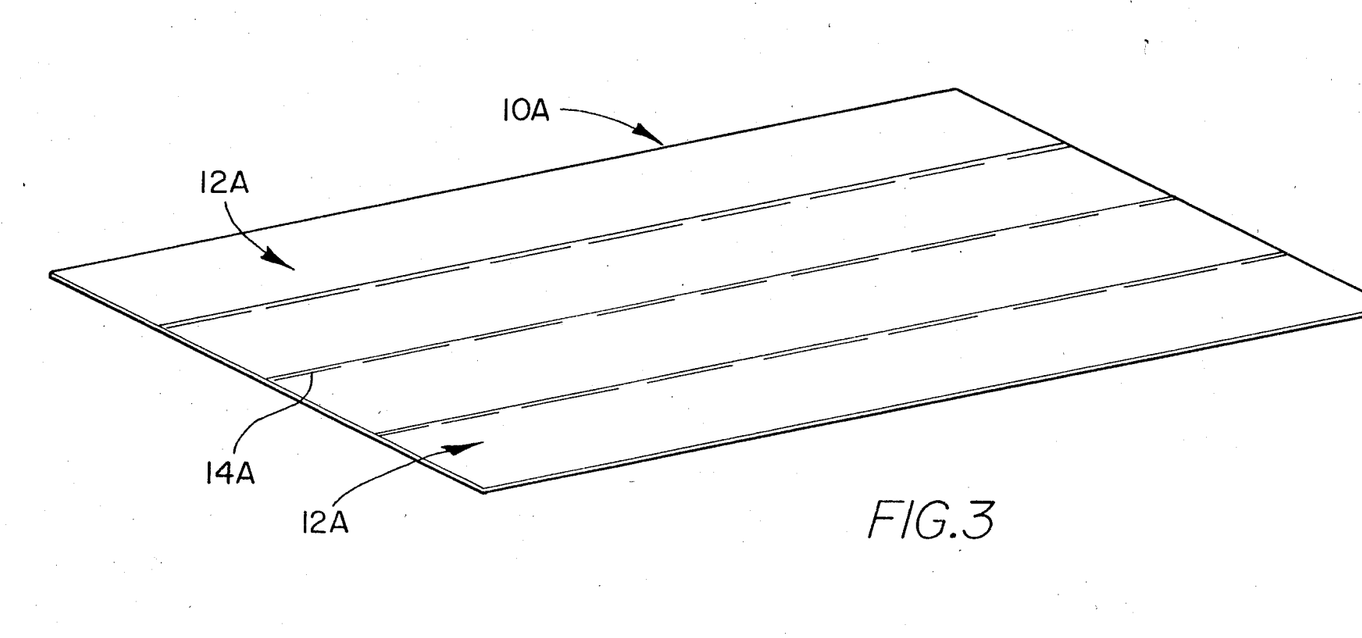
FIG. 3 is a plan view showing an arrangement of a series of small flexible membrane sections which collectively form a large sheet for a vulcanizing method and apparatus.
Figure 4:
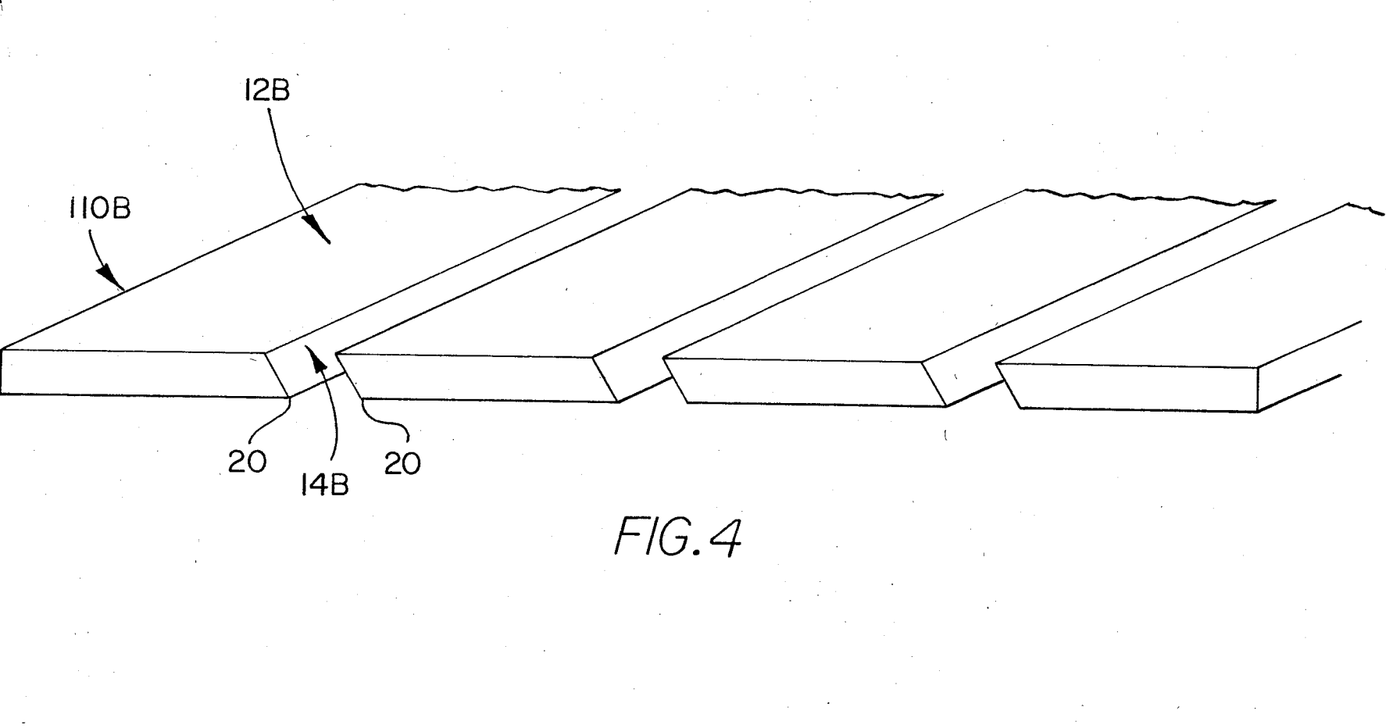
FIG. 4 is an exploded isometric view, partly broken away, of the sheet of FIG. 3.

To provide a large sheet formed of a multiplicity of small sheet sections in a process characterized by significantly reduced labor and manufacturing costs for forming a large sheet of uniformly high quality, FIG. 3 and FIG. 4 illustrate a large unvulcanized membrane or sheet 10A of rubber or the like, of about 20 feet × 100 feet formed from smaller unvulcanized elongated sections 12A each of which are about 5 feet × 100 feet. As illustrated in FIG. 3, large sheet 10A is formed of small section sheets 12A having edges 14A which are preferably tapered to form corresponding bevelled surfaces. As illustrated in FIG. 4, mating tapered edges 20 of adjacent sections 12B are joined together to form bevelled longitudinal seams 14B within large sheet 10B whereby no overlapping of edges 20 occurs. To enable use of an adhesive, a solvent preferably is applied to ensure quality adhesive bonding for joining the tapered mating edges 20 of the smaller sections to form seams 14B in large sheet 10B which are stronger and less noticeable than in conventional large sheets. By tapering mating edges 20 of smaller sections, relatively increased mating contact areas between adjacent small sections are created than is the case in edge-to-edge abuttment. Through the action of the vulcanizing process on the tapered edges, seams 14B within large sheets 10B have improved shear strength and separation resistance.

Figure 5:
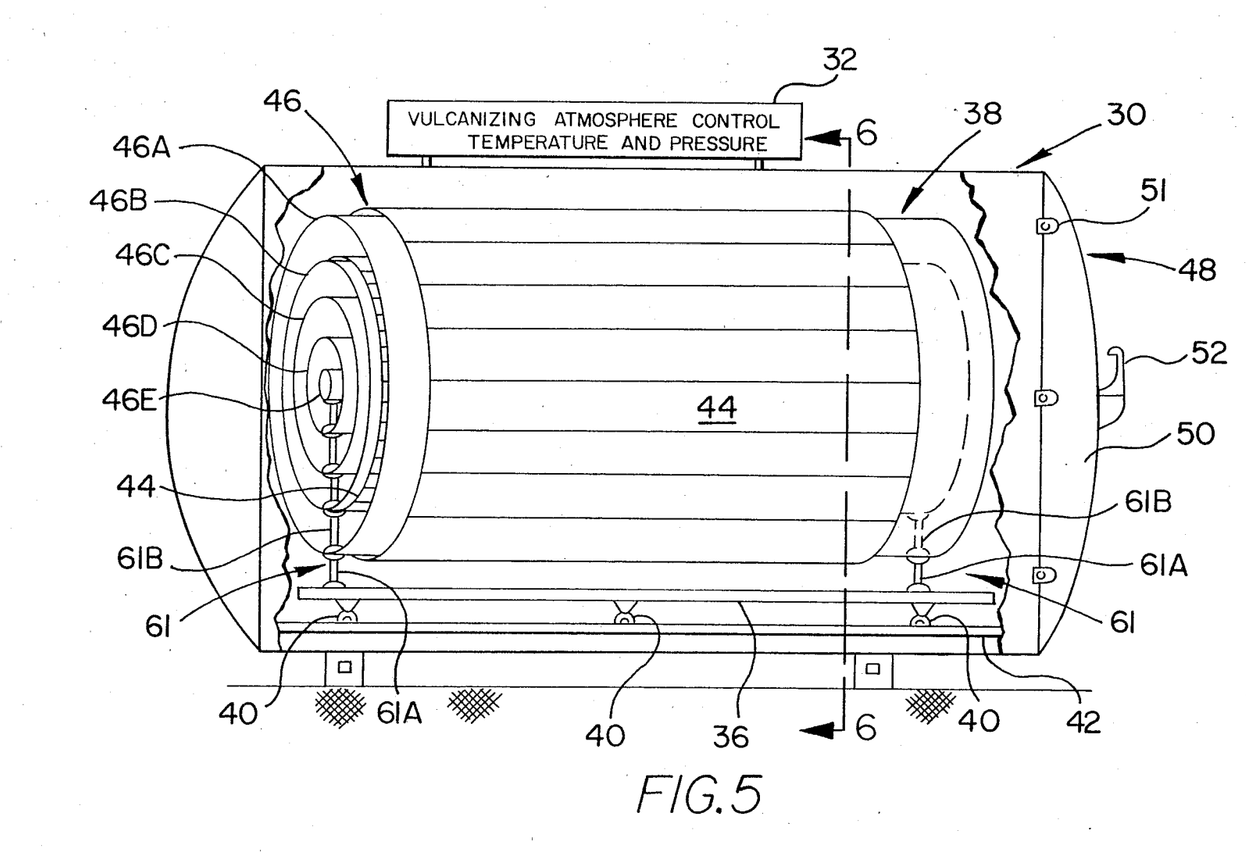
FIG. 5 is a side view, partly in section and partly broken away, of an apparatus incorporating this invention.

FIG. 5 illustrates an apparatus of this invention which may be used in the method of this invention and comprises a vulcanizing receptacle 30, and control means 32 for providing a vulcanizing atmosphere within a vulcanizing chamber 38. The control means 32 preferably is of a type which is well known and within the skill of persons working in the vulcanizing art as, for example, mixtures of compressed air, the ratios of which are regulated by mechanical controls. It will be sufficient for a understanding of this invention that the vulcanizing atmosphere may be maintained at a pre-selected optimum for the material undergoing vulcanizing in accordance with well-established conventional techniques.

Vulcanizing receptacle 30 is provided with one end 48 through which a carriage 36 and a series of mandrels 46 are inserted and removed from chamber 38. A closure or cover 50 is secured to end 48 of the receptacle 30 by means of a conventional latching device 52, to allow closure 50 to seal chamber 38. The clousre 50 is hinged to receptacle 30 so that it may be swung by latching device 52.

To increase the capacity of a vulcanizing chamber, while significantly decreasing the number of wraps per length of sheet and reducing the number of mandrels required to support sheet lengths, a concentric arrangement of mandrels 46 is disclosed which vastly reduces labor costs while expanding production capacity in vulcanizing operation. A plurality or series of mandrels 46 are shown mounted on a carriage 36 for axial movement within the chamber 38 of cylindrical vulcanizing receptacle 30. Carriage 36 is supported on rollers 40 or the like which are movably mounted on guide rails 42 so that carriage 36 may be easily moved into and out of chamber 30. Once installed carriage 36 supports mandrels 46 holding unvulcanizing sheets 44 in the interior of chamber 38 during the vulcanizing operation.

Largest diameter mandrel 46A concentrically encloses a series of smaller diameter mandrels 46B through 46E within the chamber 38. A series of pairs of support means 61 are located at opposite axial ends of each mandrel to support mandrels 46 with chamber 38. As such, large mandrel 46A is shown as supported on support means 61A, located at opposite axial ends of large mandrel 46A. Smaller mandrels 46B–46E are similarly supported by support means 61B–61E. Sheet material 44 is wrapped on the outer surfaces of each mandrel between pairs of support means 61.

Figure 6:
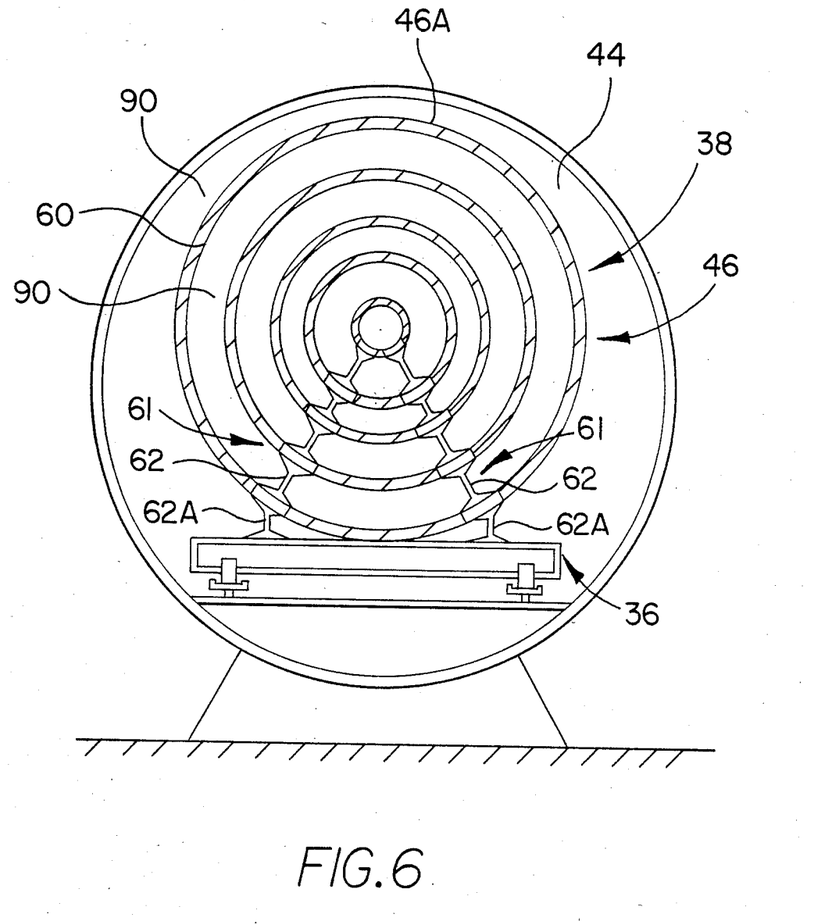
FIG. 6 is an enlarged end view, partly in section, taken along line 6—6 of the apparatus of FIG. 5.

Referring now to FIG. 6, the specific contents of vulcanizing chamber 38 are shown in detail and generally comprise carriage 36, concentric mandrels 46 and support means 61. The concentric mandrels comprise a series of hollow cylindrical drums 60 of progressively smaller diameter which may be of generally uniform length journalled within each other. The outer surface of each mandrel end is shown supported by a pair of spaced support means 61, such as bearing member 62 having an I-shaped cross-section. Each bearing member 62 has a top surface of arcuate shape conforming in contour to the surface of the mandrel of next smaller diameter to be supported. The base of each bearing member 62 is rigidly secured to the inner surface of an end of the next larger mandrel, except for the outermost bearing member 62A which has its base directly mounted on carriage 36.

Each of the mandrels 46 serves to support convolutions of sheet material 44. The sheet material 44 is disposed on the mandrels, such as largest mandrel 46A, in multiple wraps such that the outside surface of layered sheet material 44 will not contact the interior surface of the next larger surrounding member. Sheet material 44 is wrapped on mandrel surfaces between the support means 61, such as end bearing members 62, with the width of sheet 44 extending the length of its mandrel. An air space 90 is created between the outer wrap on each mandrel and the interior surface of the next larger mandrel providing means for the passage of steam within the concentric mandrel arrangement. Air space 90 preferably is greater than the thickness of sheet material 44 wrapped around each mandrel to accommodate radial expansion of sheet material 44 during the vulcanizing process thereby preventing sheet disfiguration and deformation.

Figure 7:
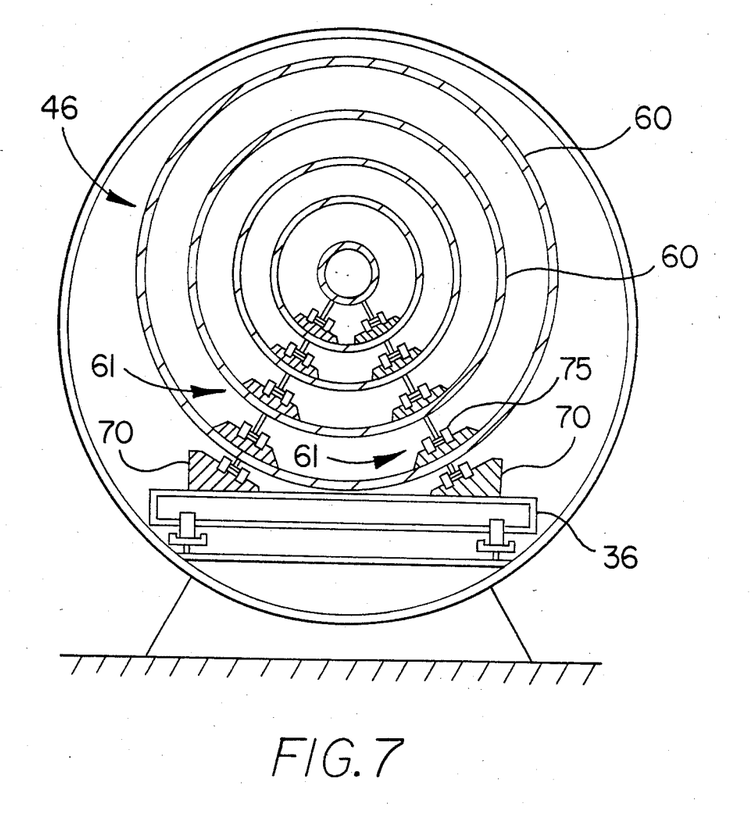
FIG. 7 is an end view, partly in section of a different embodiment of this invention.
Figure 8:
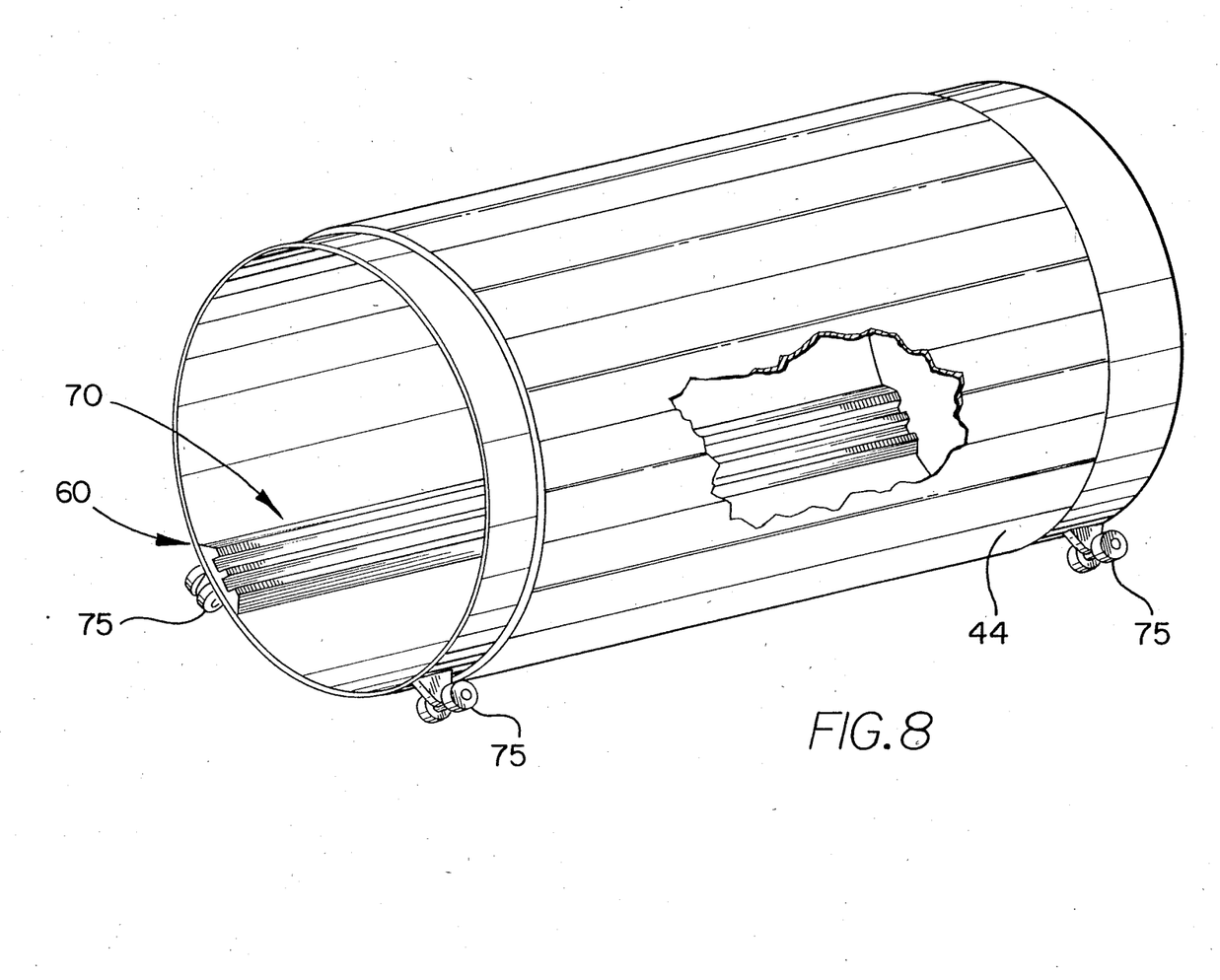
FIG. 8 is an isometric view, partly in section and partly broken away, of the apparatus of FIG. 7.

In FIGS. 7 and 8, an alternate embodiment of a support means 61 for series of mandrels 46 is illustrated as comprising a series of guide rails 70 and series of wheel assemblies 75. A pair of rails, extends the length of each mandrel drum 60 (FIG. 8) within which another mandrel is mounted at about the 5 o'clock and 7 o'clock positions when viewed from the end of the mandrel (FIG. 7). The mandrel to be supported on the interior guide rails 70 have a pair of exterior wheel assemblies 75 at each of its opposite axial ends. The outermost or largest mandrel may be similarly supported on guide rails 70 placed on carriage 36.

During actual manufacture, the chamber may be quickly loaded. In a vulcanizing chamber with a chamber diameter of 12 feet, sheet is wrapped about a mandrel of maximum size, say of, 10 feet diameter. Wrapped sheet layers have their respective ends tightly bound to the mandrels with tape, and with the intermediate portion of the layers unconfined. Additional sheets are formed and wrapped about smaller mandrels, with diameters say, of 8, 6, 4 and 2 feet, respectively. The mandrels so wrapped are arranged concentrically within one another with the largest mandrel being in surrounding relation to the other mandrels and resting on support means. If desired, the largest mandrel may be provided with wheel assemblies as shown in FIG. 8, supporting the largest mandrel for movement into the vulcanizer. Alternatively, the mandrels may be placed onto a carriage as shown in FIG. 5 and inserted into the chamber. With chamber loaded, the mandrel arrangement just described enables an increased capacity for the vulcanizing chamber without negatively affecting the vulcanizing process.

The sheet material may be sheathed (encased in a covering) or unsheathed in the vulcanization of this product. If sheathed, the covering is wrapped around individual mandrels so that it rests against the outer surfaces of the sheet. The sheath completely encloses its respective sheet and is held in position by one or more pressure devices, such as coil springs or bands, used to encircle it and hold it in position. The purpose of the sheath is to prevent the outside sheet surfaces from being scratched or scored during vulcanization. The sheath is formed of flexible material such as rubber, lead or stainless steel.

During vulcanization, the sheets are subjected to a pressure which holds the layers of sheets together and acts to force the layers together. High pressure steam is admitted to the vulcanizing chamber through a conventional system, the pressure being determined by the particular material being vulcanizing. It has been found that the present invention is applicable for vulcanizing a wide variety of materials.

Steam enters the vulcanizing chamber and circulates throughout. The air space allows for the steam to circulate freely. As the steam passes between the interior mandrel surfaces and the sheets, the steam flows around the sheets to heat them. As the pressure in the vulcanizing chamber builds, the temperature increases rapidly so that the flow of steam around the sheets tends to soften them. At the same time, a pressure is built up so that the sheets are squeezed around the mandrels. Thus, the tapered edges, initially formed in the small sections, are intimately formed into flat smooth mating edges, thus giving the large sheet a more uniform surface area, a better appearance and increased wind resistance than sheets formed by known conventional processes.

Thus it will be seen that during the vulcanizing process the pressure applied to the sheet serves to force the mating tapered edges together so that a consistently smooth and uniform flexible sheet surface is obtained. The pressure acts to hold the layered sheets in assembled relationship during the process.

Another advantage of the present invention is that it produces flexible roofing sheets having a uniform surface structure free of undesired talc or other dusting compounds. Initially, talc is placed between the sheet wraps to prevent them from sticking together during the vulcanizing process. Under conventional processes, the talc residue, normally left on sheets after the vulcanizing process is completed, must be removed in a separate laborious step to allow adhesive used during a roofing installation to adhere to the surface of the sheet. Significant savings in labor costs may be obtained by removing the talc as a separate step in the process. In this invention the pressures built up in the process are used to remove the talc. Sudden reduction in the pressure of the vulcanizing chamber causes the steam to abruptly expand thereby blowing off the talc from the confronting surfaces of the sheet.

By loading the mandrels in the described concentric arrangement, the capacity of the vulcanizing chamber not only is increased but the number of wraps and the number of mandrels required is vastly reduced. Table I is for illustrative purposes only and shows a comparison between capacities of two 12 feet inside diameter chambers, one using conventional mandrel loading, having fourteen 2 feet outside diameter mandrels (FIG. 2), and the other using the concentric mandrel arrangement of this invention having 5 mandrels with outside diameters of 10, 8, 6, 4 and 2 feet (FIG. 6).

The capacities of the two types of vulanizing units are compared in Table I wherein the approximate length (in feet) per wrap is determined by times the outside diameter of the mandrel and it is assumed that each mandrel will have an equal number of wraps of sheet 20 feet wide. By providing equal radial distances between mandrels and an equal number of wraps about each mandrel, the total thickness of sheet (wherein the thickness of the sheet is between 45 and 60 mils) wrapped about each mandrel is limited to a given dimension and equally spaced from the next larger unit.

TABLE I

| Mandrel Outside Diameter | Approx. Length Ft. Per Wrap | Approximate Number of Wraps | Approx. Capacity in Sq. Ft. |
|---|---|---|---|
| Conventional Mandrel Arrangement | | | |
| 2 | 6.28 | 16 | 2000 |
| Total Capacity of 14 Mandrels | — | 224 | 28,000 |
| Mandrel Arrangement of This Invention | | | |
| 2 | 6.28 | 16 | 2000 |
| 4 | 12.57 | 16 | 4022 |
| 6 | 18.85 | 16 | 6032 |
| 8 | 25.13 | 16 | 8042 |
| 10 | 31.42 | 16 | 10,054 |
| Total Capacity of 5 Mandrels | — | 80 | 30,150 |

As can be seen from the foregoing results and detailed description, the present invention provides a novel and improved vulcanizing apparatus for elastomeric sheet material and the like and method of production therefor. The concentric arrangement of mandrels increases the capacity of a vulcanizing chamber, while significantly decreasing the number of wraps and mandrels, thereby vastly reducing labor costs as heretofore required and expands the production capacity of a vulcanizing operation in a facile and economic manner. Additionally it provides a method of forming rectangular sections of elastomeric material which increases sheet strength while requiring a reduced number of process handling and lower labor cost.

As will be apparent to persons skilled in the art, various modifications, adaptations and variations of the foregoing specific disclosure can be made without departing from the teachings of this invention.

I claim:

1. An apparatus for vulcanizing sheets of unvulcanized elastomeric material and the like comprising:
   (a) a vulcanizer having a generally cylindrical pressure chamber therein;
   (b) means providing a vulcanizing atmosphere within the chamber; and
   (c) a series of concentric mandrels mounted in the chamber of the vulcanizer with the individual mandrels in radially spaced relationship to one another, the mandrels serving as individual supports for multiple wraps of sheet material to be subjected to the vulcanizing atmosphere.

2. The apparatus of claim 1 wherein the vulcanizer includes end walls at opposite axial ends of the receptacle, one of the end walls having an opening to allow the mandrels and the sheet material wrapped thereon to be inserted and removed from the vulcanizing chamber.

3. The apparatus of claim 1 wherein the mandrels are each of cylindrical construction and of a common length, and wherein the individual mandrels are of different diameter.

4. The apparatus of claim 1 further including mounting means for supporting the mandrels within the chamber in concentric relationship to one another, each mandrel being received within the mandrel of the next larger diameter.

5. The apparatus of claim 4 wherein the mounting means for the mandrels includes a carriage, such carriage and each of the mandrels and material sheets supported thereon being insertable and removable from the chamber as a unit.

6. The apparatus of claim 4 or 5 wherein the mounting means for supporting the mandrels includes a plurality of mandrel supports at opposite axial ends of each of the mandrel the mandrel of maximum diameter encompassing the remainder of the mandrels upon their being installed within the chamber of the vulcanizer.

7. The apparatus of claim 6 wherein the mounting means for supporting the mandrels further includes guide means on an interior surface of each mandrel for engaging the mandrel supports, the mandrel supports being attached to an exterior surface of the next smaller diameter mandrel.

8. An apparatus for vulcanizing sheets of unvulcanized elastomeric material and the like comprising:
   (a) a vulcanizer having a generally cylindrical pressure chamber;
   (b) means providing a vulcanizing atmosphere within the chamber;
   (c) a series of mandrels each of hollow cylindrical construction and of common length, each mandrel being uniformly shaped and having a diameter different from that of other mandrels, the diameter of the individual mandrels being preselected to provide generally uniform spacing between mandrels; and
   (d) mounting means for supporting the mandrels within the chamber in concentric relationship to one another.

9. The apparatus of claim 8 wherein said spacing between mandrels is greater than the thickness of the material wrapped about each mandrel, whereby the spacing serves to accommodate radial expansion of the sheet material during vulcanizing.

10. The apparatus of claim 8 wherein interior surfaces of the mandrels serve as a retaining means for the sheets wrapped about the next smaller diameter mandrel.

11. The apparatus of claim 8 wherein the vulcanizer includes an open end through which the mandrels and the sheet material thereon are inserted and removed from the vulcanizer, a cover to close and seal the open end, and releasable locking means for the cover.

* * * * *

UNITED STATES PATENT AND TRADEMARK OFFICE
CERTIFICATE OF CORRECTION

PATENT NO. : 4,591,329
DATED : May 27, 1986
INVENTOR(S) : Thomas L. Kelly

It is certified that error appears in the above—identified patent and that said Letters Patent is hereby corrected as shown below:

First page, in the title, wherein the words "CONCENTRIC LOADING VULCANIZER AND METHOD OF VULCANIZING" should be --CONCENTRIC LOADING VULCANIZER--.

Column 3, line 50, wherein the words "to prevent then" should be --to prevent them--.

Column 4, line 32, wherein the word "clousre" should be --closure--.

Column 6, line 10, wherein the words "being vulcanizing" should be --being vulcanized--.

Column 6, line 63, wherein the words "by times" should be --by pi times--.

Column 8, line 18, wherein the words "the mandrel the mandrel" should be --the mandrels, the mandrel--.

Signed and Sealed this

Third Day of February, 1987

Attest:

DONALD J. QUIGG

*Attesting Officer*    *Commissioner of Patents and Trademarks*